(12) United States Patent
Zhang

(10) Patent No.: US 8,599,811 B2
(45) Date of Patent: Dec. 3, 2013

(54) BROADBAND COMMUNICATION APPARATUS AND METHOD FOR IMPLEMENTING TELEPHONE SERVICE

(75) Inventor: Jinfeng Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 89 days.

(21) Appl. No.: 13/355,912

(22) Filed: Jan. 23, 2012

(65) Prior Publication Data

US 2012/0113804 A1 May 10, 2012

Related U.S. Application Data

(63) Continuation of application No. PCT/CN2009/074729, filed on Oct. 30, 2009.

(51) Int. Cl.
*H04W 4/00* (2009.01)

(52) U.S. Cl.
USPC .......................................................... 370/338

(58) Field of Classification Search
USPC ................. 370/216–225, 328–339, 351–356, 370/395.5–395.52, 400–401, 463–464
See application file for complete search history.

(56) References Cited

U.S. PATENT DOCUMENTS

| | | | |
|---|---|---|---|
| 2002/0151302 A1 * | 10/2002 | Schmidt et al. | 455/426 |
| 2004/0034723 A1 | 2/2004 | Giroti | |
| 2004/0121726 A1 * | 6/2004 | Bifano et al. | 455/8 |
| 2007/0173223 A1 | 7/2007 | Mehio et al. | |
| 2007/0201450 A1 * | 8/2007 | Borislow et al. | 370/356 |
| 2008/0112392 A1 * | 5/2008 | Mansfield | 370/352 |

FOREIGN PATENT DOCUMENTS

| | | |
|---|---|---|
| CN | 101427599 A | 5/2009 |
| CN | 101478835 A | 7/2009 |
| CN | 101527897 A | 9/2009 |
| EP | 1250014 A2 | 4/2002 |
| WO | 2007089812 A1 | 8/2007 |
| WO | WO 2009/074767 A1 | 6/2009 |
| WO | WO 2011/050536 A1 | 5/2011 |

OTHER PUBLICATIONS

International Search Report for International Application No. PCT/CN2009/074729, mailed Jul. 15, 2010, Huawei Technologies Co., Ltd.

EPO Extended Search Report mailed Jul. 6, 2012, issued in related European Application No. 09850742.9, Huawei Technologies Co., Ltd. (11 pages).

Foreign Communication From a Counterpart Application—Extended European Search Report and Written Opinion, Application No. 12189274.9, Jan. 30, 2013, 5 pages.

Foreign Communications From a Counterpart Application, PCT/CN2009/074729, English Translation of the International Written Opinion, dated Jul. 15, 2010, 5 pages.

* cited by examiner

*Primary Examiner* — Frank Duong
(74) *Attorney, Agent, or Firm* — Conley Rose, P.C.; Grant Rodolph; Nicholas K. Beaulieu

(57) ABSTRACT

A broadband communication apparatus includes a broadband communication module, configured to provide an interaction channel between a terminal and a broadband network; a wireless communication module, configured to provide an interaction channel between the terminal and a wireless network; a monitoring module, connected with the broadband communication module, and configured to trigger a switching module when detecting a failure of the interaction channel between the terminal and the broadband network; and the switching module, configured to connect the interaction channel between the terminal and the broadband network, and when triggered by the monitoring module, configured to connect the interaction channel between the terminal and the wireless network.

17 Claims, 6 Drawing Sheets

BROADBAND COMMUNICATION APPARATUS AND METHOD FOR IMPLEMENTING TELEPHONE SERVICE

CROSS-REFERENCE TO RELATED APPLICATIONS

This application is a continuation of International Application No. PCT/CN2009/074729, filed on Oct. 30, 2009, which is hereby incorporated by reference in their entireties.

FIELD OF THE INVENTION

The embodiments of the present invention relate to a communication technology, and in particular, to a broadband communication apparatus and a method for implementing a telephone service.

BACKGROUND OF THE INVENTION

As broadband networks such as Asymmetrical Digital Subscriber Line (hereinafter referred to as ADSL), Very-high-bit-rate Digital Subscriber Line (hereinafter referred to as VDSL), and Fiber To The x (hereinafter referred to as FTTx) (x represents the destination) rapidly develop, and the technologies and applications such as Voice over Digital Subscriber Line (hereinafter referred to as VoDSL) and Voice over Internet Protocol (hereinafter referred to as VoIP) are mature, the increased broadband rate and the improved network Quality of Service (hereinafter referred to as QoS) mechanism may ensure that the conversation quality of VoIP calls is equivalent to the conversation quality of Public Switched Telephone Network (hereinafter referred to as PSTN) calls. Since 2006, the global VoIP market develops rapidly, and the telecom operators gradually replace the traditional PSTN/Integrated Service Digital Network (ISDN) voice service by the VoDSL/VoIP voice service, and phase out the operation of the existing PSTN/ISDN network to reduce the Operating Expense (herein after referred to as OPEX).

However, in the process of implementing the present invention, the inventor finds that when implementing the VoIP telephone service, the IP-based broadband network and the IP Multimedia Subsystem (IMS) are vulnerable to connectivity failure, which may make the VoIP telephone service unavailable.

As a technical solution to the problem in the prior art, "PSTN/ISDN+VoIP" is adopted to implement the telephone service. However, the PSTN/ISDN network device is required to be preserved and maintained, and this increases the OPEX for the telecom operators. Therefore, a solution for implementing the telephone service without any PSTN/ISDN network device is desired.

SUMMARY OF THE INVENTION

The embodiments of the present invention provide a broadband communication apparatus and a method for implementing a telephone service so that telephone service can be implemented without any PSTN/ISDN network device.

A broadband communication apparatus for implementing a telephone service provided in an embodiment of the present invention includes:
a broadband communication module, configured to provide an interaction channel between a terminal and a broadband network;
a wireless communication module, configured to provide an interaction channel between the terminal and a wireless network;
a monitoring module, connected with the broadband communication module, and configured to trigger a switching module when detecting a failure of the interaction channel between the terminal and the broadband network; and
the switching module, configured to connect the interaction channel between the terminal and the broadband network; and when the monitoring module triggers the switching module, configured to connect the interaction channel between the terminal and the wireless network.

A broadband communication method for implementing a telephone service provided in an embodiment of the present invention includes:
triggering, by a monitoring module, a switching module when the monitoring module detects a failure of an interaction channel between a terminal and a broadband network; and
connecting, by the switching module, an interaction channel between the terminal and a wireless network when the switching module is triggered by the monitoring module.

In the preceding technical solution, when the VoIP telephone service implemented by the broadband network is detected as unavailable, the switching module is controlled to be switched to the wireless network to implement the telephone service. The preceding technical solution may fully use the wireless network device, and involve no maintenance of the PSTN/ISDN network device. In this way, the PSTN/ISDN network device may be phased out to save the OPEX.

DETAILED DESCRIPTION OF THE EMBODIMENTS

Embodiment 1

Figure 1:
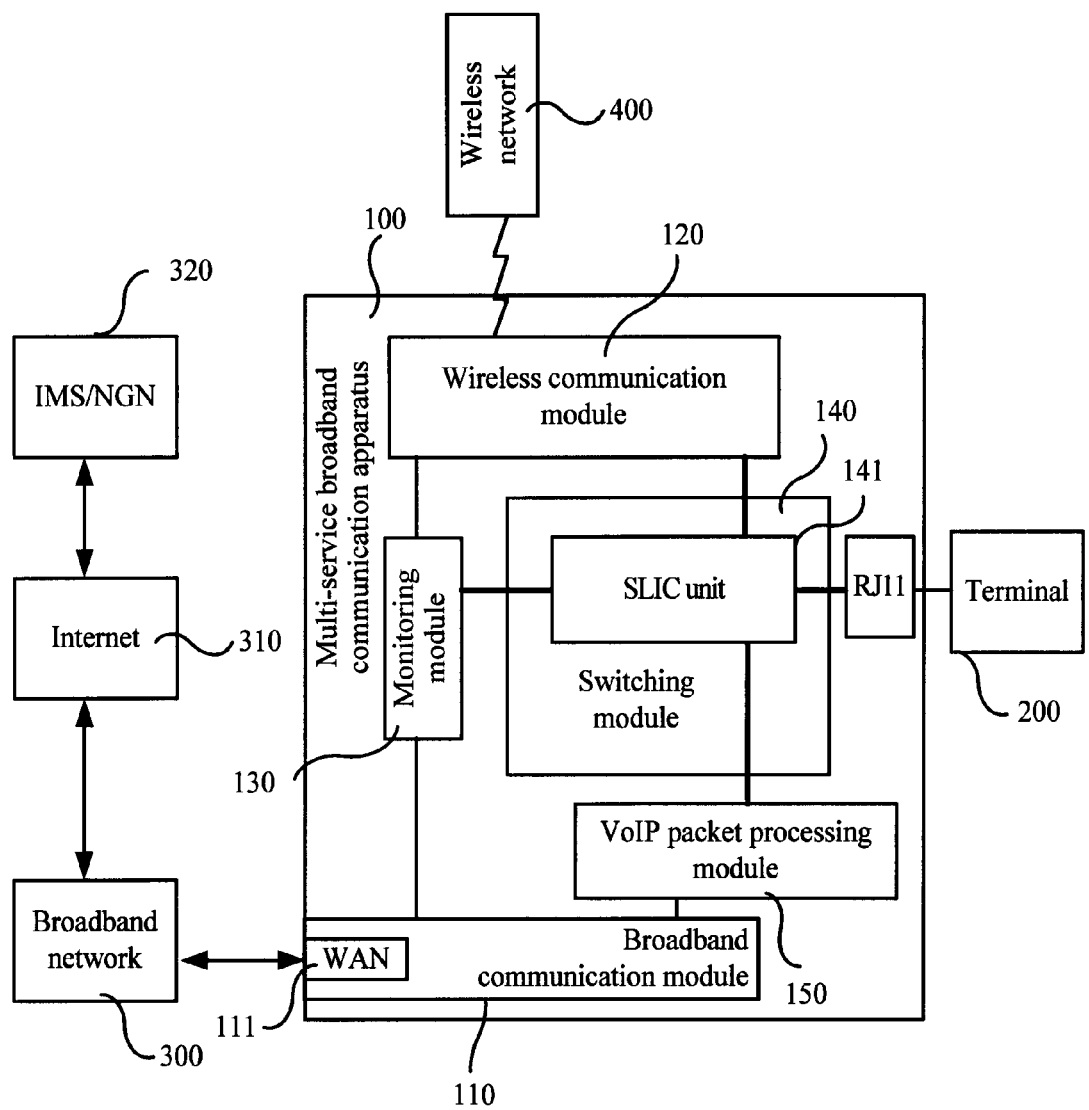
FIG. 1 is a schematic diagram showing a structure of a broadband communication apparatus for implementing a telephone service according to a first embodiment of the present invention.

FIG. 1 is a schematic diagram showing a structure of a broadband communication apparatus for implementing a telephone service according to a first embodiment of the present invention. The apparatus in this embodiment is also known as a multi-service broadband communication apparatus 100 (or known as a Customer Premises Equipment, hereinafter referred to as CPE). The apparatus includes a broadband communication module 110, a wireless communication module 120, a monitoring module 130, and a switching module 140.

The broadband communication module 110 is configured to provide an interaction channel between a terminal 200 and a broadband network 300. The wireless communication module 120 is configured to provide an interaction channel between the terminal 200 and a wireless network 400. The monitoring module 130 is connected with the broadband communication module 110, and is configured to trigger the switching module 140 when detecting a failure of the interaction channel between the terminal 200 and the broadband network 300. The switching module 140 is configured to connect the interaction channel between the terminal 200 and the broadband network 300; and when the monitoring module 130 triggers the switching module 140, the switching module 140 is switched to the interaction channel between the terminal 200 and the wireless network 400.

In the preceding technical solution, the broadband communication module 110 provides the interaction channel between the terminal 200 and the broadband network 300. That is, the broadband communication module 110 can provide encapsulation and decapsulation processing of IP packets of voice data transmitted between the terminal 200 and the broadband network 300, and can provide processing such as routing of the IP packets and signaling control, thus ensuring the transmission of the IP packets. The wireless communication module 120 can provide the interaction channel between the terminal 200 and the wireless network 400, namely, provide encapsulation and decapsulation of the wireless frames of the voice data transmitted between the terminal 200 and the wireless network 400, and provide signaling control. The switching module 140 connects the interaction channel, that is, the switching module 140 implements data exchange between the terminal 200 and the broadband communication module 110 or the wireless communication module 120. Unless the switching module 140 connects an interaction channel (namely, the interaction channel between the terminal 200 and the broadband network 300, or the interaction channel between the terminal 200 and the wireless network 400), the communication module on the interaction channel can receive the voice data from the terminal 200 to perform corresponding processing; and process the data obtained from the network, and then transmit the processed data to the terminal 200 through the switching module 140.

It can be seen that, in the technical solution provided in the preceding embodiment, when detecting that the VoIP telephone service implemented by the broadband network 300 is unavailable, the monitoring module 130 triggers the switching module 140 so that the switching module 140 is switched to the wireless network 400. In this way, the telephone service may be implemented through the wireless network 400, and the telephone service can be provided for users without involving any PSTN/ISDN network device. This technical solution may fully use the existing wireless network devices without maintaining the PSTN/ISDN network device. The PSTN/ISDN network device may be phased out to save the OPEX.

Furthermore, the "PSTN/ISDN+VoIP" mode for implementing the telephone service and ensuring the lifeline function in the prior art depends on the PSTN/ISDN network device. Through this embodiment of the present invention, when the interaction channel between the terminal and the broadband network fails, the telephone service may be implemented in wireless mode so that a reliable lifeline function is provided.

The monitoring module 130 may further be connected with the wireless communication module 120.

The monitoring module 130 is further configured to trigger the switching module 140 when detecting recovery of the interaction channel between the terminal 200 and the broadband network 300.

The switching module 140 is configured to connect the interaction channel between the terminal 200 and the broadband network 300 when the monitoring module 130 triggers the switching module 140.

It can be seen that, when the interaction channel between the terminal 200 and the broadband network 300 is recovered, the monitoring module 130 triggers the switching module 140 so that the switching module 140 connects the interaction channel between the terminal 200 and the broadband network 300. In this way, the interaction channel between the terminal 200 and the broadband network 300 is used preferentially.

In this embodiment, the terminal 200 may have many forms such as a telephone. To accommodate different terminals 200, the multi-service broadband communication apparatus 100 in this embodiment may set different interfaces, for example, a telephone interface for plugging a telephone as the terminal 200. A typical telephone interface is generally RJ11.

The switching module 140 in this embodiment may include a Subscriber Line Interface Circuit (hereinafter referred to as SLIC) unit 141. The SLIC unit 141 is connected with the telephone interface, and is configured to connect the interaction channel between the telephone and the broadband network 300 to transmit voice data, and when triggered by the monitoring module 130, switched to the interaction channel between the telephone and the wireless network 400 to transmit voice data.

For a general telephone service, dialup information needs to be transmitted first. The dialup information includes a calling number and a called number. A voice channel is set up through interactions between the broadband communication module or the wireless communication module and the network. After the voice channel is set up, the voice channel may be used to transmit voice data.

The SLIC unit 141 that transmits the voice data may be connected between the telephone and the broadband communication module 110, and between the telephone and the wireless communication module 120 through a circuit. In a normal working state, the broadband communication module 110 and the telephone are connected preferentially. When the monitoring module 130 triggers the switching module 140, the SLIC unit 141 switches the circuit to connect the telephone and the wireless communication module 120, transmits the voice data from the wireless communication module 120 to the telephone, and transmits the voice data from the telephone to the wireless communication module 120, so that the voice data is transmitted to the wireless network 400 through an air interface, thus implementing the telephone service based on the wireless network 400. The SLIC unit 141 may implement the traditional line management function, namely, seven functions "BORSCHT" defined by the Consultative Committee International Telephone and Telegraph (hereinafter referred to as CCITT) for analog users.

The following describes the preferred structures of the broadband communication module 110, the wireless communication module 120, and the monitoring module 130 provided in this embodiment.

As shown in FIG. 1, on the broadband network 300, network elements that bear IP packets to implement the telephone service include an Internet 310 and an IMS/Next Generation Network (NGN) 320. The broadband communication module 110 may include a broadband network interface 111 connected with the broadband network 300. The broadband network interface 111 is also known as a broadband uplink interface—Wide Area Network (hereinafter referred to as WAN) interface 111 such as an RJ11, RJ45 or optical interface. Broadband communication signals transmitted on the transmission line of the broadband network 300 can be exchanged. The broadband communication signals may be based on ADSL, ADSL2, ADSL2+, VDSL, VDSL2, Ethernet, Ethernet Passive Optical Network (hereinafter referred to as EPON), or Gigabit Passive Optical Network (hereinafter referred to as GPON). The broadband communication module 110 may be based on ADSL, ADSL2, ADSL2+, VDSL, VDSL2, Ethernet, EPON, or GPON. The broadband network interface 111 receives and sends the IP packets that bear the IP data exchanged between the terminal 200 and the broadband network 300. Specifically, all relevant communication control functions such as routing, forwarding, and switching may be implemented.

The broadband communication module 110 is configured to implement the VoIP telephone service through the broadband network 300. The voice data transmitted on the interaction channel between the broadband network 300 and the terminal 200 is encapsulated into IP packets, and transmitted as IP data.

In the technical solution in this embodiment, a VoIP packet processing module 150 for processing IP data transmitted by the broadband network 300 is generally set. This module is configured to perform conversion between the voice data provided by the terminal 200 and the IP data transmitted by the broadband network 300, for example, packetizing and depacketizing. The SLIC unit 141 transmits the voice data from the VoIP packet processing module 150 to the telephone, and transmits the voice data from the telephone to the VoIP packet processing module 150, and then the broadband communication module 110 transmits the voice data to the broadband network 300 through the transmission line, thus implementing the VoIP telephone service.

Figure 2:
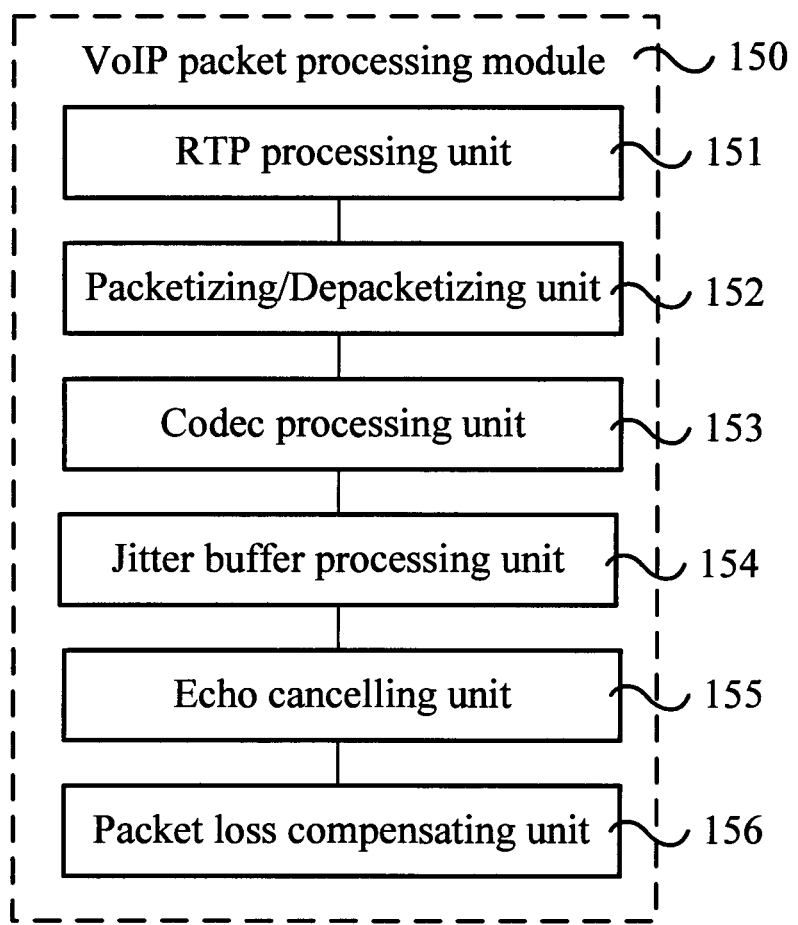
FIG. 2 is a schematic diagram showing a structure of an IP voice packet processing module according to the first embodiment of the present invention.

FIG. 2 is a schematic diagram showing a structure of an IP voice packet processing module according to the first embodiment of the present invention. Preferably, the VoIP packet processing module 150 includes a Real-time Transport Protocol (hereinafter referred to as RTP) processing unit 151, a packetizing/depacketizing unit 152, a codec processing unit 153, a jitter buffer processing unit 154, an echo cancelling unit 155, and a packet loss compensating unit 156. The RTP processing unit 151 is configured to perform RTP processing for voice data or IP packets. The packetizing/depacketizing unit 152 is configured to packetize the voice data or depacketize the IP packet. The codec processing unit 153 is configured to perform codec processing for voice data or IP packets. The jitter buffer processing unit 154 is configured to perform jitter buffer processing for voice data or IP packets. The echo cancelling unit 155 is configured to perform echo cancellation for voice data or IP packets. The packet loss compensating unit 156 is configured to compensate for lost packets in the voice data or IP packets. In practice, the VoIP packet processing module 150 may be set to support Session Initiation Protocol (hereinafter referred to as SEP), H.323, and Media Gateway Control Protocol (hereinafter referred to as MGCP), and communicate with the corresponding IMS/NGN system.

Voice signals that come from the terminal 200 are transmitted to the VoIP packet processing module 150; converted into voice streams transmissible on the line after undergoing coding, RTP processing, and IP packetization processing; and encapsulated by the broadband communication module 110 into IP packets for transmitting on the line of the broadband network 300. In the same way, after receiving the decapsulated IP packets by the broadband communication module 110, voice streams coming from the broadband network 300 are transmitted to the VoIP packet processing module 150 for IP depacketizing, RTP processing, and decoding processing so that the voice streams are converted into voice signals. The voice signals are transmitted to the terminal 200 to implement VoIP conversation.

The wireless communication module 120 may use an antenna component to interact with the wireless network 400 based on an air interface. The wireless communication module 120 may be implemented based on the technical standards such as Global System for Mobile Communications (hereinafter referred to as GSM), Time Division Multiple Access (hereinafter referred to as TDMA), Code Division Multiple Access (hereinafter referred to as CDMA), Wideband CDMA (hereinafter referred to as WCDMA), or Time Division-Synchronous Code Division Multiple Access (hereinafter referred to as TD-SCDMA).

The wireless communication module 120 used in the telephone service includes an air interface and a wireless communication controlling unit. The air interface is connected with the wireless network 400; the wireless communication controlling unit is configured to receive and send the voice data exchanged between the terminal 200 and the wireless network 400, and perform relevant wireless processing such as coding and scheduling.

Preferably, the monitoring module 130 in this embodiment includes a connectivity monitoring unit and a network device monitoring unit. The connectivity monitoring unit is connected with the broadband network interface 111 of the broadband communication module 110, and is configured to trigger the switching module 140 when detecting a failure of the connectivity of the broadband network 300. The network device monitoring unit is connected with the broadband network interface 111, and is configured to trigger the switching module 140 when detecting any fault of the network device in the broadband network 300.

The failure of the connectivity of the broadband network 300 and the fault of the network device may cause a failure of the interaction channel provided by the broadband communication module 110. That is, a failure of the interaction channel includes two types: connectivity failure and network device fault, for example, fault of a registration server of the IMS. In practice, the failure of the interaction channel between the terminal 200 and the broadband network 300 may be caused by many other factors, for example, fault of the broadband communication module 110 may cause a failure of the interaction channel. The monitoring module 130 may monitor the connectivity of the broadband network 300 and the network device by different means such as a heartbeat mechanism, the number of retransmission times, and a response message.

When detecting that the VoIP telephone service is unavailable, the monitoring module 130 may trigger the switching module 140 so that the switching module 140 is switched to the wireless network 400. In this way, the telephone service is implemented through the wireless network 400; furthermore, the telephone service is continually provided for users through the wireless network 400 when the connectivity of the broadband network 300 fails or the network device is faulty. The preceding technical solution may fully use the wireless network device without maintaining the PSTN/ISDN network device, so that the PSTN/ISDN network device may be phased out to save the OPEX. Typically, the preceding technique solution ensures the lifeline function of the VoIP telephone service without depending on the PSTN/

ISDN network device. Through this embodiment of the present invention, when the interaction channel between the terminal and the broadband network fails, the telephone service may be implemented in wireless mode so that a reliable lifeline function is provided.

Embodiment 2

Figure 3:
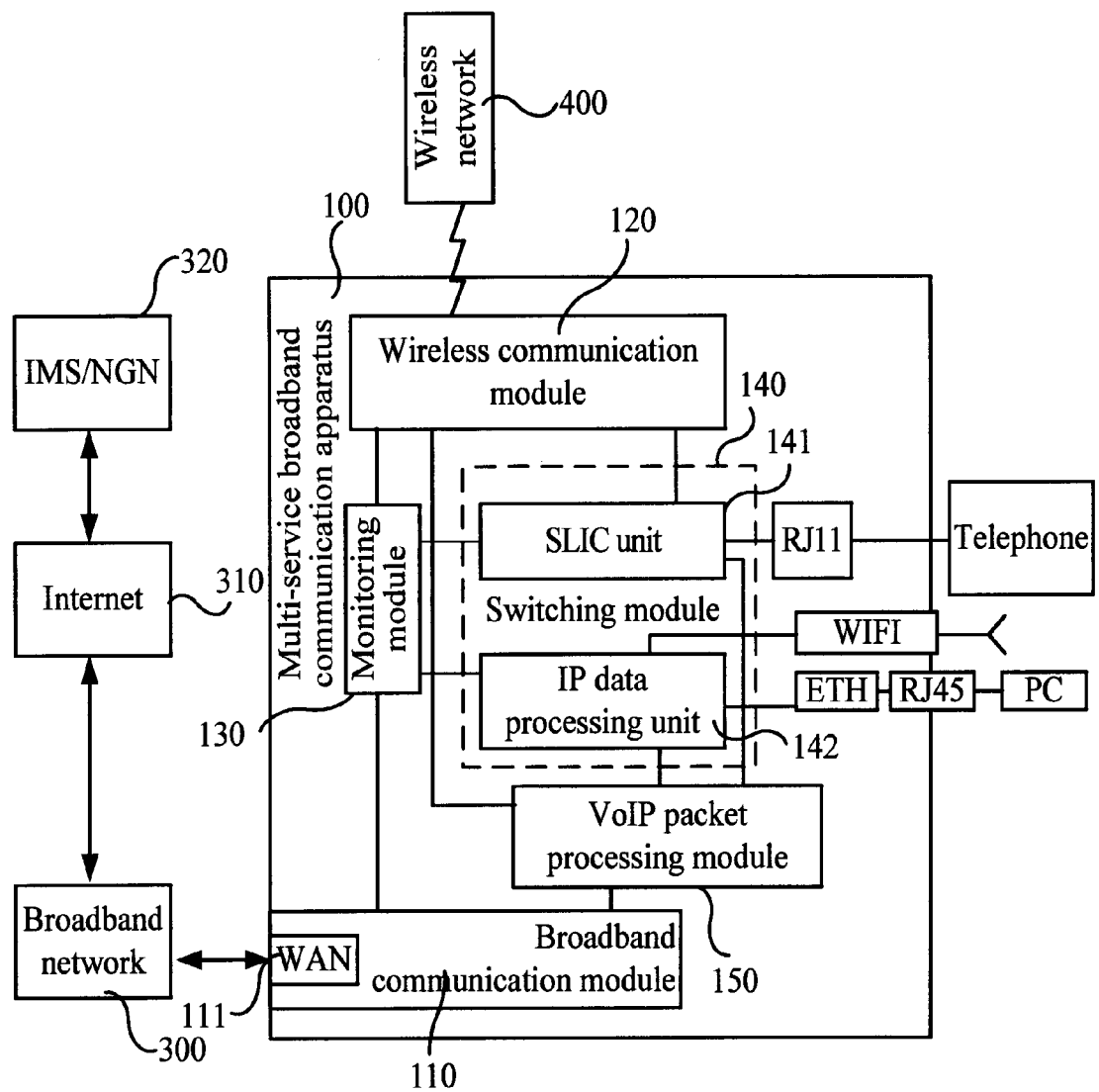
FIG. 3 is a schematic diagram showing a structure of a broadband communication apparatus for implementing a telephone service according to a second embodiment of the present invention.

FIG. 3 is a schematic diagram showing a structure of a broadband communication apparatus for implementing a telephone service according to a second embodiment of the present invention. The difference between this embodiment and the first embodiment is that: A multi-service broadband communication apparatus 100 in this embodiment includes an IP port, which is configured to be connected with a Personal Computer (PC) as a terminal 200. Client software is installed on the computer to convert voice data into IP data for transmitting to implement the telephone function. A typical IP port may be an Ethernet (ETH) interface or a Wireless Fidelity (WiFi, based on the 802.11 protocol) interface, for example, an RJ45 interface.

A switching module 140 in this embodiment includes an IP data processing unit 142. The IP data processing unit 142 is connected with the IP port which is connected with the computer as a terminal 200. The IP data processing unit 142 is configured to transmit IP data processed by a VoIP packet processing module 150 in an interaction channel between the computer and a broadband network 300. When triggered by a monitoring module 130, the IP data processing unit 142 is switched to the interaction channel between the computer and a wireless network 400 to transmit the IP data processed by the VoIP packet processing module 150. Specifically, when triggering the IP data processing unit 142, the monitoring module 130 may change a sending port of an IP packet in a routing table of the IP data processing unit 142. When the interaction channel provided by a broadband communication module 110 fails, the IP packet sending port in the routing table may be changed to a port of a wireless communication module 120. The IP data processing unit 142 sets a sending port for the IP packet according to the routing table, and then the IP packet is processed by the VoIP packet processing module 150 and sent from the corresponding sending port.

When detecting that a VoIP telephone service is unavailable, the monitoring module 130 triggers the IP data processing unit 142 so that the IP data processing unit 142 is switched to the wireless network 400. In this way, the VoIP is preferentially used to implement the telephone service through the wireless network 400, and the telephone service is continually provided for users through the wireless network 400 when the connectivity of the broadband network 300 fails or the network device is faulty. The preceding technical solution may fully use the wireless network devices without maintaining the PSTN/ISDN network device. In this way, the PSTN/ISDN network device may be phased out to save the OPEX.

Embodiment 3

Figure 4:
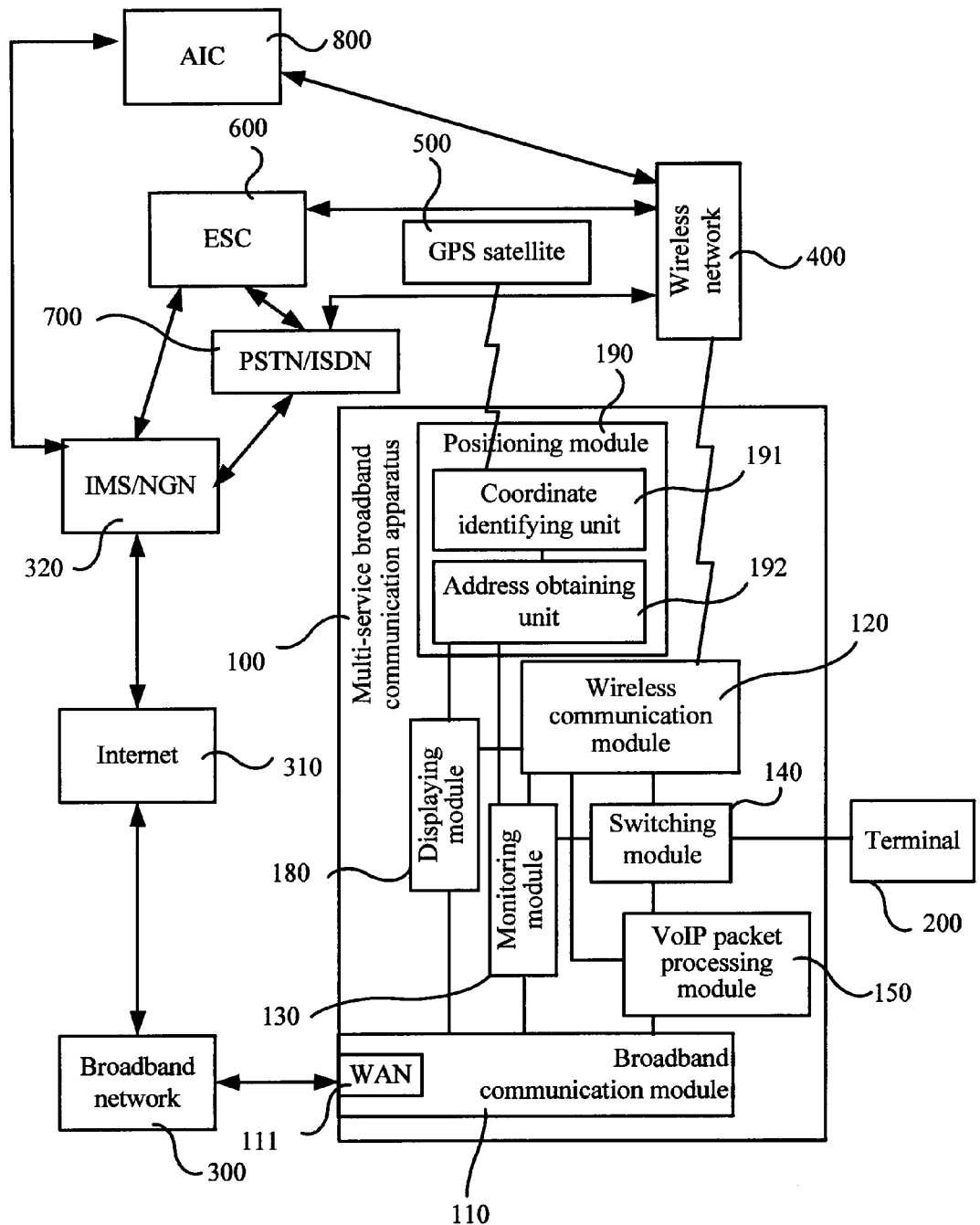
FIG. 4 is a schematic diagram showing a structure of a broadband communication apparatus for implementing a telephone service according to a third embodiment of the present invention.

FIG. 4 is a schematic diagram showing a structure of a broadband communication apparatus for implementing a telephone service according to a third embodiment of the present invention. The difference between this embodiment and the first embodiment or the second embodiment is that: An apparatus provided in this embodiment further includes a positioning module 190. The positioning module 190 is configured to identify local information based on a positioning system. When a monitoring module 130 detects that a terminal 200 calls an Emergency Service Center (ESC) 600 in an interaction channel currently in use, the local information may be sent to the ESC 600 through a wireless communication module 120 or a broadband communication module 110. The interaction channel currently in use may be provided by the broadband communication module 110 or the wireless communication module 120.

The local information includes local position coordinates, or both the local position coordinates and address information corresponding to the local position coordinates.

The positioning module 190 may use an antenna component to interact with a Global Positioning System (hereinafter referred to as GPS) satellite 500 through an air interface to identify the position coordinates by obtaining satellite signals. The positioning module 190 may be implemented based on a positioning system such as American GPS, Russian GLONASS positioning system, European Galileo positioning system, Chinese Beidou satellite positioning system, or Assisted GPS (hereinafter referred to as A-GPS). When local address information includes the local position coordinates, the positioning module 190 may include a coordinate identifying unit 191. Under this circumstance, after identifying the local position coordinates based on the positioning system, the coordinate identifying unit 191 may be connected to the ESC 600 through a broadband network 300 or a wireless network 400. Whether the coordinate identifying unit 191 is connected the ESC 600 through a broadband network 300 or through a wireless network 400 depends on the interaction channel currently in use is provided by the broadband communication module 110 or the wireless communication module 120. "Local position" refers to the position of the positioning module 190, namely, the position of a multi-service broadband communication apparatus 100 into which the positioning module 190 is integrated. In fact, the local position is generally the position of the terminal 200. In this way, when calling the ESC 600 such as 110, 911, 120 or 999, the terminal 200 can send the local information to the ESC 600 at the same time, so that the terminal 200 is effectively positioned in time when implementing a lifeline function in the telephone service.

Furthermore, an IMS/NGN 320 on the broadband network 300 or the wireless network 400 may be connected with an existing PSTN/ISDN 700 network through a device such as a media gateway to convert signaling and media streams so that the existing PSTN/ISDN 700 network element device can be utilized. The connection architecture is shown in FIG. 4.

If the local information includes the local position coordinates and the address information corresponding to the local position coordinates, the positioning module 190 for obtaining the address information includes a coordinate identifying unit 191 and an address obtaining unit 192. The coordinate identifying unit 191 is configured to identify the local position coordinates based on the positioning system; and the address obtaining unit 192 is configured to query an Address Information Center (AIC) 800 for the corresponding address information according to the local position coordinates. In this way, the terminal 200 may also call the ESC 600.

In the positioning module 190, the position coordinates obtained by the coordinate identifying unit 191 based on the positioning system may be stored in a register. Preferably, the local position coordinates are identified through satellite positioning periodically, and the register is updated when the identified position coordinates are different from the position coordinates stored in the register, thus ensuring that the position coordinates in the register are the latest position coordinates.

The AIC 800 may be a table of mapping between the local coordinate position pre-stored in the multi-service broadband communication apparatus 100 and the detailed administrative address. Preferably, the AIC 800 is set on the network side. Each multi-service broadband communication apparatus 100 may share the AIC 800 through the broadband network 300 and/or the wireless network 400. That is, the address obtaining unit 192 of the positioning module 190 may interact with the AIC 800 through the broadband communication module 110 and/or the wireless communication module 120.

Based on the preceding technical solution, the apparatus in this embodiment (namely, the multi-service broadband communication apparatus 100) may further include a displaying module 180. The displaying module 180 is connected with the address obtaining unit 192, and is configured to display the address information to the user, namely, may display the detailed administrative address corresponding to the position coordinates to the user so that the user can confirm or change the address information. The displaying module 180 may send an address information update command to the AIC 800 to update the address information after receiving the address information update command input by the user. Specifically, the address information update command may be sent through the broadband communication module 110 or the wireless communication module 120 to update the address information corresponding to the position coordinates in the AIC 800. Through the preceding technical solution, the user may check whether the detailed address information returned by the AIC 800 is correct through the displaying module 180. If the detailed address information is not correct, the incorrect address information may be fed back to the manager of the AIC 800 for correcting.

Through the technical solution in this embodiment, when the user calls the ESC 600 in emergencies, the broadband communication module 110 or the wireless communication module 120 may send the positioning system position coordinates stored in the register to the ESC 600 automatically through a specific program interface.

Preferably, in the technical solution in this embodiment, the broadband communication module 110, the wireless communication module 120, the monitoring module 130, and the positioning module 190 are integrated into the same physical apparatus, and are connected with the terminal 200 through the same SLIC unit 141 so as to monitor the switching control mechanism and preferentially adopt the broadband communication module 110 for implementing the telephone service.

Embodiment 4

Figure 5:
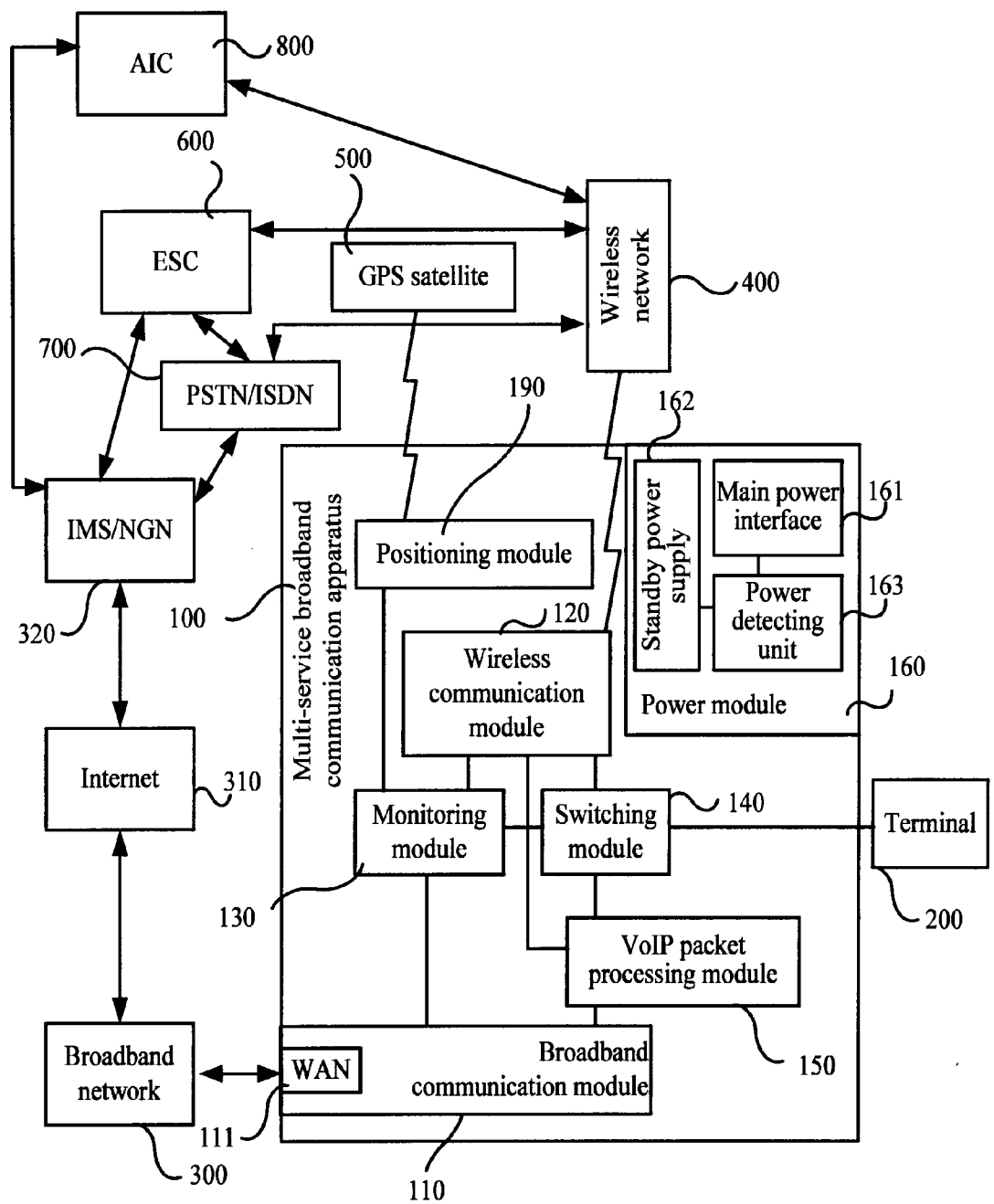
FIG. 5 is a schematic diagram showing a structure of a broadband communication apparatus for implementing a telephone service according to a fourth embodiment of the present invention.

FIG. 5 is a schematic diagram showing a structure of a broadband communication apparatus for implementing a telephone service according to a fourth embodiment of the present invention. This embodiment may be based on all the embodiments described in the preceding, and may further include a power module 160. The power module 160 includes a main power interface 161, a standby power supply 162, and a power monitoring unit 163. The main power interface 161 is configured to be inserted by power cables to supply power for the functional modules. The power monitoring unit 163 is connected with the main power interface 161 and the standby power supply 162, and is configured to trigger the standby power supply 162 to supply power for the functional modules when detecting that the main power interface 161 stops supplying power.

In this embodiment, the standby power supply 162 may be a standby battery. The main power interface 161 may be connected with the functional modules that requires to be supplied power (the detailed connection relations are not shown in the figure), such as the broadband communication module 110, wireless communication module 120, monitoring module 130, switching module 140, and terminal 200 to supply power. The standby power supply 162 is connected with at least the wireless communication module 120, the positioning module 190, and the terminal 200 (the detailed connection relations are not shown in the figure), and is configured to provide a secondary power supply for the wireless communication module 120, the positioning module 190, and the terminal 200 to maintain the work when the main power interface 161 fails to be supplied power at home or in the company, and is especially applicable to the case that a telephone is used as the terminal 200.

Through the technical solution in this embodiment, the VoIP telephone service can still be implemented when a power failure occurs at home or in the company. The wireless communication module 120 consumes little power, and may be powered by the standby power supply 162 to maintain the telephone service and provide a reliable lifeline function.

The apparatus provided in the preceding embodiment may work in the following way:

First, the apparatus is initialized. In a normal working state, after being powered on, the broadband communication module 110 is generally initialized and then enters a running state to provide the interaction channel between the broadband network 300 and the terminal 200, and implements the telephone service when a telephone call is originated. After being powered on, the wireless communication module 120 is generally initialized, and is then connected with the external wireless network 400. Then, the wireless communication module 120 may send a READY message to the monitoring module 130, notifying that the initialization is completed and communications may be performed. After being powered on, the positioning module 190 is generally initialized so as to obtain the local information.

After being initialized, the apparatus enters the normal working state, namely, provides the interaction channel between the broadband network 300 and the terminal 200 based on the broadband communication module 110, and implements the telephone service based on the VoIP. In this process, the positioning module 190 may collect satellite signals periodically to obtain the local information, store the local information into the register, and update the address information in the register through periodical collection. Meanwhile, the monitoring module 130 may monitor the availability of the interaction channel between the broadband network 300 and the terminal 200 in real time. if detecting a failure of the interaction channel between the broadband network 300 and the terminal 200, the monitoring module 130 triggers a wireless working state, namely, triggers the switching module 140 to connect and provide the interaction channel between the terminal 200 and the wireless network 400. A failure of the interaction channel between the broadband network 300 and the terminal 200 may be caused by the failure of connectivity of the broadband network 300 or by the device fault of the broadband network 300.

In the wireless working state, the wireless communication module 120 is in a running state, and the interaction channel between the wireless network 400 and the terminal 200 is provided and ready for providing a telephone service for the user, and especially, providing a lifeline function for the user.

When an emergency call is detected, the information obtained by the positioning module 190 is sent to the ESC 600 through the interaction channel currently in use. Preferably, the monitoring module 130 monitors the interaction channel currently in use, and sends the address information to the ESC 600 through the broadband communication module 110 or the wireless communication module 120 when detecting an emergency call. That is, the monitoring module 130 may further include an emergency call detecting unit, which is configured to send the local information to the ESC 600 through the broadband communication module 110 or the wireless communication module 120 when detecting a call originated by the terminal 200 to the ESC 600 on the interaction channel currently in use.

The technical solution in this embodiment provides a multi-service broadband communication apparatus 100 for implementing accurate positioning and a VoIP telephone service. In a normal working state, the interaction channel is connected between the terminal 200 and the broadband network 300, and voice streams and data streams of the user may be transmitted in the broadband network 300 through the multi-service broadband communication apparatus 100. The apparatus may implement the VoIP telephone service, and continue to provide the telephone service for the user by using the wireless communication module 120 through the wireless network 400 when the VoIP telephone service fails.

Obviously, based on the specific structure of the apparatus, the apparatus may further implement various data services available in the broadband network 300. The address information obtained based on the positioning system may solve the positioning problems caused by mobility under wireless communication conditions alone. Especially, fast and accurate positioning the position of the user is very useful in the case that emergent rescue is needed.

The technical solution in this embodiment may enable the operator to phase out the PSTN/ISDN 700 network device, and to use the existing broadband network 300 and wireless network 400 to reduce the OPEX, and this may keep with a development trend of the VoIP technology.

Embodiment 5

Figure 6:
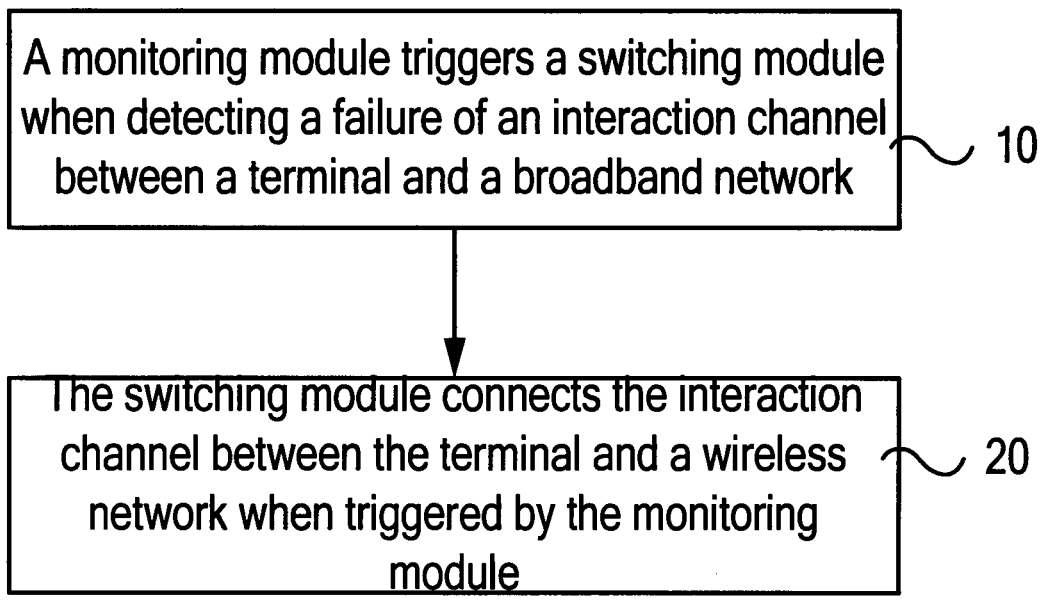
FIG. 6 is a flowchart of a broadband communication method for implementing a telephone service according to a fifth embodiment of the present invention.

FIG. 6 is a flowchart of a broadband communication method for implementing a telephone service according to a fifth embodiment of the present invention. This method may be implemented based on the broadband communication apparatus for implementing a telephone service in the present invention, and include the following steps:

Step 10: A monitoring module triggers a switching module when detecting a failure of an interaction channel between a terminal and a broadband network.

Step 20: The switching module connects an interaction channel between the terminal and a wireless network when triggered by the monitoring module.

In the technical solution provided in this embodiment, when the VoIP telephone service implemented by the broadband network is detected as unavailable, the telephone service is implemented through the wireless network instead, so that the telephone service can be provided for the user without any PSTN/ISDN network device. This technical solution fully uses the existing wireless network device without maintaining the PSTN/ISDN network device. In this way, the PSTN/ISDN network device may be phased out to save the OPEX.

On the basis of the embodiments of the present invention, the step of the monitoring module detecting the failure of the interaction channel between the terminal and the broadband network provided by a broadband communication module may include: The monitoring module detects whether the connectivity of the broadband network fails or the network device on the broadband network side is faulty, and, if the connectivity of the broadband network fails or the network device on the broadband network side is faulty, determines that the interaction channel between the terminal and the broadband network fails.

After the monitoring module triggers the switching module, the process may include the following steps:

The monitoring module periodically detects whether the interaction channel (which is provided by the broadband communication module) between the terminal and the broadband network is available, for example, whether the connectivity of the network is recovered or whether the network device is recovered from the fault. If the connectivity of the network is recovered or the network device is recovered from the fault, the monitoring module controls the switching module to recover the state before the switching. In this way, the interaction channel between the terminal and the wireless network is disconnected and the interaction channel between the terminal and the broadband network is connected simultaneously.

The preceding technical solution ensures that the broadband network is preferentially used for implementing the VoIP telephone service.

In preceding step 20, when triggered by the monitoring module, the step of the switching module connecting the wireless communication module and providing the interaction channel between the terminal and the wireless network may include:

A SLIC unit is connected with a telephone interface into which a telephone is inserted as a terminal. When voice data is transmitted on the interaction channel between the telephone and the broadband network and the monitoring module triggers the SLIC unit, the SLIC unit is switched to the interaction channel between the telephone and the wireless network to transmit the voice data, where the SLIC unit is equivalent to a switching module.

Alternatively, an IP data processing unit is connected with an IP port of a computer serving as a terminal. When IP data processed by a VoIP packet processing module is transmitted on the interaction channel between the computer and the broadband network, and the monitoring module triggers the IP data processing unit, the IP data processing unit is switched to the interaction channel between the computer and the wireless network to transmit the IP data processed by the VoIP packet processing module, where the IP data processing unit is equivalent to a switching module.

Through the preceding technical solution, a specific circuit may be used to connect the wireless communication module and the broadband communication module to the telephone, so that the multi-service broadband communication apparatus may be integrated effectively for convenient installation and use.

The broadband communication method for implementing a telephone service provided in the fifth embodiment further includes:

sending local information to an ESC through a broadband communication module or a wireless communication module after a monitoring module detects that a terminal calls the ESC, where the local information is identified by a positioning module based on a positioning system.

The step of sending local information to an ESC through a broadband communication module or a wireless communication module includes:

obtaining local position coordinates based on a positioning system;

querying an AIC according to the local position coordinates for obtaining address information corresponding to the local position coordinates; and sending the address information to the ESC through a broadband communication module or a wireless communication module.

Furthermore, the step of querying an AIC according to the local position coordinates for obtaining address information corresponding to the local position coordinates includes:

storing the local position coordinates which are obtained periodically based on the positioning system; when detecting that the local position coordinates obtained next time are different from the stored position coordinates, querying the AIC according to the last obtained local position coordinates for obtaining address information corresponding to the last obtained position coordinates, and updating the stored address information.

Furthermore, the broadband communication method for implementing a telephone service further includes:

displaying the address information corresponding to the local position coordinates to the user; or displaying the address information corresponding to the local position coordinates to the user, and sending an address information update command to the AIC for updating the address information when receiving the address information update command input by the user.

A "PSTN/ISDN+VoIP" mode for implementing the telephone service and ensuring a lifeline function in the prior art depends on the PSTN/ISDN network device. Through this embodiment of the present invention, when the interaction channel between the terminal and the broadband network fails, the telephone service may be implemented in a wireless mode so that a reliable lifeline function is provided.

Persons of ordinary skill in the art should understand that all or a part of the steps of the method according to the embodiments of the present invention may be implemented by a program instructing relevant hardware. The program may be stored in a computer readable storage medium. When the program runs, the steps of the method according to the embodiments of the present invention are executed. The storage medium may be any medium that is capable of storing program codes, such as a Read Only Memory (ROM), a Random Access Memory (RAM), a magnetic disk, or a Compact Disk Read-Only Memory (CD-ROM).

Finally, it should be noted that the preceding embodiments are merely used to describe the technical solutions of the present invention, but not intended to limit the present invention. It is apparent that persons skilled in the art may make various modifications to the technique solutions described in the embodiments or make equivalent replacements to some technique features without departing from the spirit and scope of the invention.

What is claimed is:

1. A broadband communication apparatus for implementing a telephone service, comprising:
    a broadband communication module configured to provide an interaction channel between a terminal and a broadband network;
    a wireless communication module configured to provide an interaction channel between the terminal and a wireless network;
    a monitoring module connected with the broadband communication module, configured to trigger a switching module when detecting a failure of the interaction channel between the terminal and the broadband network, and configured to detect whether the terminal calls an Emergency Service Center (ESC) on an interaction channel currently in use;
    the switching module configured to connect the interaction channel between the terminal and the broadband network and configured to connect the interaction channel between the terminal and the wireless network when triggered by the monitoring module; and
    a positioning module configured to identify local information based on a positioning system, wherein the local information is sent to the ESC through the wireless communication module or the broadband communication module when the monitoring module detects that the terminal calls the ESC on the interaction channel currently in use.

2. The apparatus according to claim 1, wherein the terminal comprises a telephone, and wherein the switching module comprises a Subscriber Line Interface Circuit (SLIC) unit connected with an interface of the telephone, configured to connect an interaction channel between the telephone and the broadband network to transmit voice data, and configured to connect an interaction channel between the telephone and the wireless network to transmit voice data when triggered by the monitoring module.

3. The apparatus according to claim 1, wherein the terminal comprises a computer, and wherein the switching module comprises an Internet Protocol (IP) data processing unit connected with an IP port of the computer, configured to transmit IP data processed by a Voice over IP (VoIP) packet processing module on an interaction channel between the computer and the broadband network, and configured to connect an interaction channel between the computer and the wireless network and transmit IP data processed by the VoIP packet processing module when triggered by the monitoring module.

4. The apparatus according to claim 1, wherein the local information comprises local position coordinates, and wherein the positioning module comprises a coordinate identifying unit configured to identify the local position coordinates based on the positioning system.

5. The apparatus according to claim 4, wherein the local information further comprises address information corresponding to the local position coordinates, and wherein the positioning module further comprises an address obtaining unit configured to query an Address Information Center (AIC) according to the local position coordinates for obtaining address information corresponding to the local position coordinates.

6. The apparatus according to claim 5, further comprising a display module configured to:
    display the address information corresponding to the local position coordinates to a user; or
    display the address information corresponding to the local position coordinates to the user and send an address information update command to the AIC for updating the address information when receiving the address information update command input by the user.

7. The apparatus according to claim 1, wherein the monitoring module comprises:
    a connectivity monitoring unit connected with a broadband network interface of the broadband communication module and configured to trigger the switching module when detecting a failure of connectivity of the broadband network; and
    a network device monitoring unit connected with the broadband network interface and configured to trigger the switching module when detecting any fault of a network device in the broadband network.

8. The apparatus according to claim 1, wherein the monitoring module comprises:
    a connectivity monitoring unit connected with a broadband network interface of the broadband communication module and configured to trigger the switching module when detecting failure of connectivity of the broadband network;

a network device monitoring unit connected with the broadband network interface and configured to trigger the switching module when detecting any fault of a network device on the broadband network side; and an emergency call detecting unit configured to send the local information to the ESC through the broadband communication module or the wireless communication module when detecting a call originated by the terminal to the ESC on the interaction channel currently in use.

9. The apparatus according to claim 1, further comprising a power module which comprises a main power interface, a standby power supply, and a power detecting unit, wherein the main power interface is configured to be inserted by power cables to supply power for functional modules that require power to be supplied and wherein the power detecting unit is connected with the main power interface and the standby power supply and is configured to trigger the standby power supply to supply power to the functional modules that require power to be supplied when detecting that the main power interface stops supplying power.

10. A broadband communication method for implementing a telephone service, comprising:

triggering, by a monitoring module, a switching module when the monitoring module detects a failure of an interaction channel between a terminal and a broadband network;

connecting, by the switching module, an interaction channel between the terminal and a wireless network when the switching module is triggered by the monitoring module; and sending, by the monitoring module, local information to an Emergency Service Center (ESC) through a broadband communication module or a wireless communication module when detecting that the terminal calls the ESC, wherein the local information is identified by a positioning module based on a positioning system.

11. The method according to claim 10, wherein sending the local information to the ESC through the broadband communication module or the wireless communication module comprises:

obtaining local position coordinates based on the positioning system;

querying an Address Information Center (AIC) according to the local position coordinates for obtaining address information corresponding to the local position coordinates; and sending the address information to the ESC through the broadband communication module or the wireless communication module.

12. The method according to claim 11, wherein querying the AIC according to the local position coordinates for obtaining the address information corresponding to the local position coordinates comprises:

storing the local position coordinates which are obtained periodically based on the positioning system;

querying the AIC according to the last obtained local position coordinates for obtaining address information corresponding to the last obtained position coordinates when detecting that local position coordinates obtained are different from the stored position coordinates; and updating the stored address information.

13. The method according to claim 11, further comprising:

displaying the address information corresponding to the local position coordinates to a user; or displaying the address information corresponding to the local position coordinates to the user and sending an address information update command to the AIC for updating the address information when receiving the address information update command input by the user.

14. A non-transitory computer-readable medium having computer usable instructions stored thereon for execution by a processor, wherein the instructions cause the processor to:

trigger, by a monitoring module, a switching module when the monitoring module detects a failure of an interaction channel between a terminal and a broadband network;

connect, by the switching module, an interaction channel between the terminal and a wireless network when the switching module is triggered by the monitoring module; and send, by the monitoring module, local information to an Emergency Service Center (ESC) through a broadband communication module or a wireless communication module when detecting that the terminal calls the ESC, wherein the local information is identified by a positioning module based on a positioning system.

15. The non-transitory computer-readable medium according to claim 14, wherein the instructions cause the processor to send, by the monitoring module, the local information to the ESC through the broadband communication module or the wireless communication module comprises the instructions causing the processor to:

obtain local position coordinates based on the positioning system;

query an Address Information Center (AIC) according to the local position coordinates for obtaining address information corresponding to the local position coordinates; and send the address information to the ESC through the broadband communication module or the wireless communication module.

16. The nontransitory computerreadable medium according to claim 15, wherein the instructions cause the processor to query the AIC according to the local position coordinates for obtaining the address information corresponding to the local position coordinates comprises the instructions causing the processor to:

store the local position coordinates which are obtained periodically based on the positioning system;

query the AIC according to the last obtained local position coordinates for obtaining address information corresponding to the last obtained position coordinates when detecting that local position coordinates obtained are different from the stored position coordinates; and update the stored address information.

17. The non-transitory computer-readable medium according to claim 15, wherein the instructions further cause the processor to:

display the address information corresponding to the local position coordinates to a user; or display the address information corresponding to the local position coordinates to the user and send an address information update command to the AIC for updating the address information when receiving the address information update command input by the user.

* * * * *

UNITED STATES PATENT AND TRADEMARK OFFICE
CERTIFICATE OF CORRECTION

| | | |
|---|---|---|
| PATENT NO. | : 8,599,811 B2 | Page 1 of 1 |
| APPLICATION NO. | : 13/355912 | |
| DATED | : December 3, 2013 | |
| INVENTOR(S) | : Jinfeng Zhang | |

It is certified that error appears in the above-identified patent and that said Letters Patent is hereby corrected as shown below:

In the Claims:

Column 15/Line 18 should read: "power to be supplied, and wherein the power detecting unit is"

Column 16/Line 40 should read: "16. The non-transitory computer-readable medium accord-"

Signed and Sealed this
Fifteenth Day of April, 2014

Michelle K. Lee
*Deputy Director of the United States Patent and Trademark Office*